US006198503B1

(12) United States Patent
Weinreich

(10) Patent No.: US 6,198,503 B1
(45) Date of Patent: Mar. 6, 2001

(54) INFRA-RED VIDEO KEY

(76) Inventor: Steve Weinreich, 14 Norton Rd., Monmouth Junction, NJ (US) 08852

( * ) Notice: Subject to any disclaimer, the term of this patent is extended or adjusted under 35 U.S.C. 154(b) by 0 days.

(21) Appl. No.: 08/900,912

(22) Filed: Jul. 28, 1997

Related U.S. Application Data

(62) Division of application No. 08/109,506, filed on Aug. 20, 1993, now Pat. No. 5,681,223.

(51) Int. Cl.[7] ........ H04N 5/33

(52) U.S. Cl. ........ 348/164; 472/61; 364/460; 348/586

(58) Field of Search ........ 348/164, 590, 348/586; 358/181, 183, 75, 906

(56) References Cited

U.S. PATENT DOCUMENTS

| | | | | |
|---|---|---|---|---|
| 3,751,586 | * | 8/1973 | Johansson | 178/7.1 |
| 4,751,571 | * | 6/1988 | Lillquist | 358/113 |
| 4,764,807 | * | 8/1988 | Kimura et al. | 358/75 |
| 4,800,432 | | 1/1989 | Barnett et al. | 358/160 |
| 4,853,784 | * | 8/1989 | Abt et al. | 358/181 |
| 4,947,255 | * | 8/1990 | Jackson et al. | 358/183 |
| 4,967,276 | * | 10/1990 | Murakami et al. | 358/183 |
| 4,971,312 | * | 11/1990 | Weinreich | 350/274 |
| 5,001,558 | * | 3/1991 | Burley et al. | 358/113 |
| 5,345,313 | * | 9/1994 | Blank | 348/598 |
| 5,408,294 | * | 4/1995 | Lam | 355/22 |
| 5,574,511 | * | 11/1996 | Yang et al. | 348/586 |
| 5,681,223 | * | 10/1997 | Weinreich | 358/906 |
| 5,923,380 | * | 7/1999 | Yang et al. | 348/586 |

OTHER PUBLICATIONS

Joseph Alexander, An Infrared Traveling Matte System With Electronic Masking, SMPTE, 410–413, Jun. 1979.*

* cited by examiner

*Primary Examiner*—Howard Britton
*Assistant Examiner*—Shawn S. An

(57) ABSTRACT

A method and apparatus to isolate the video image of an object, usually a human being, from its background for use in forming a composite image. The viewer's image, with its background, is captured in both visible light and infra-red. In the preferred embodiment, the visible light image is modified by replacing, from an independent visible image source, that area corresponding to the cold (non-viewer) areas of the infra-red image.

12 Claims, 9 Drawing Sheets

INFRA-RED VIDEO KEY

This is a division of application Ser. No. 08/109,506, filed Aug. 20, 1993, now U.S. Pat. No. 5,681,223, granted Oct. 28, 1997.

BACKGROUND OF THE INVENTION

The present invention relates to an illusion apparatus and method using same. More particularly, this invention relates to a unique background display for an illusion apparatus and method for creating an illusion wherein a pre-recorded bright image on a dark background is made to appear to be inserted within the environment of the viewer. My prior U.S. Pat. No. 4,971,312, Illusion Apparatus, discloses an optical element used in conjunction with printed matter, diorama, video, or other display means. In that patent, a dark area in the display is provided to receive the viewer's image. The present invention provides an improved display and also provides a unique format to enhance the effect provided by my prior invention.

INTRODUCTION

Aspects of this invention are applicable to various forms of display, particularly video presentations. The video presentations may be live, prerecorded, or computer generated.

The invention also particularly pertains to video created for the purpose of training an individual in some physical skill such as exercise or dance, it is not, however, limited to training and may be used for other presentations as will be clear from the following.

SUMMARY OF THE INVENTION

In one aspect of the invention there is provided an illusion apparatus for making an object appear to be inside or on the surface of a display. The display may be, for example, a video image on a television monitor, a printed display, or a diorama. The apparatus includes a display in which a bright image, for example, of one or more humans, such as a training instructor or instructors, or a cartoon figure or other animated figure or inanimate object, etc. appears on a dark background; and image projection means for projecting an image of an object (usually the viewer) and the environment immediately surrounding the object on the dark background of the display. As a result, the bright image appears to be inserted into the environment (e.g. living room, studio, etc.) of the object.

In another aspect, the invention provides a method for making a bright image of an object of a display, which may be a still or action display, appear to be inserted within the environment of a viewer of the display. The method involves the steps of providing a display in which a bright image appears on a dark (e.g. black) background, and projection of an image of the viewer and the viewer's environment onto the dark background of the display. As a result, the bright image appears to be within the environment (e.g. living room) of the viewer.

DETAILED DESCRIPTION OF THE INVENTION AND PREFERRED EMBODIMENTS THEREOF

Figure 1A:
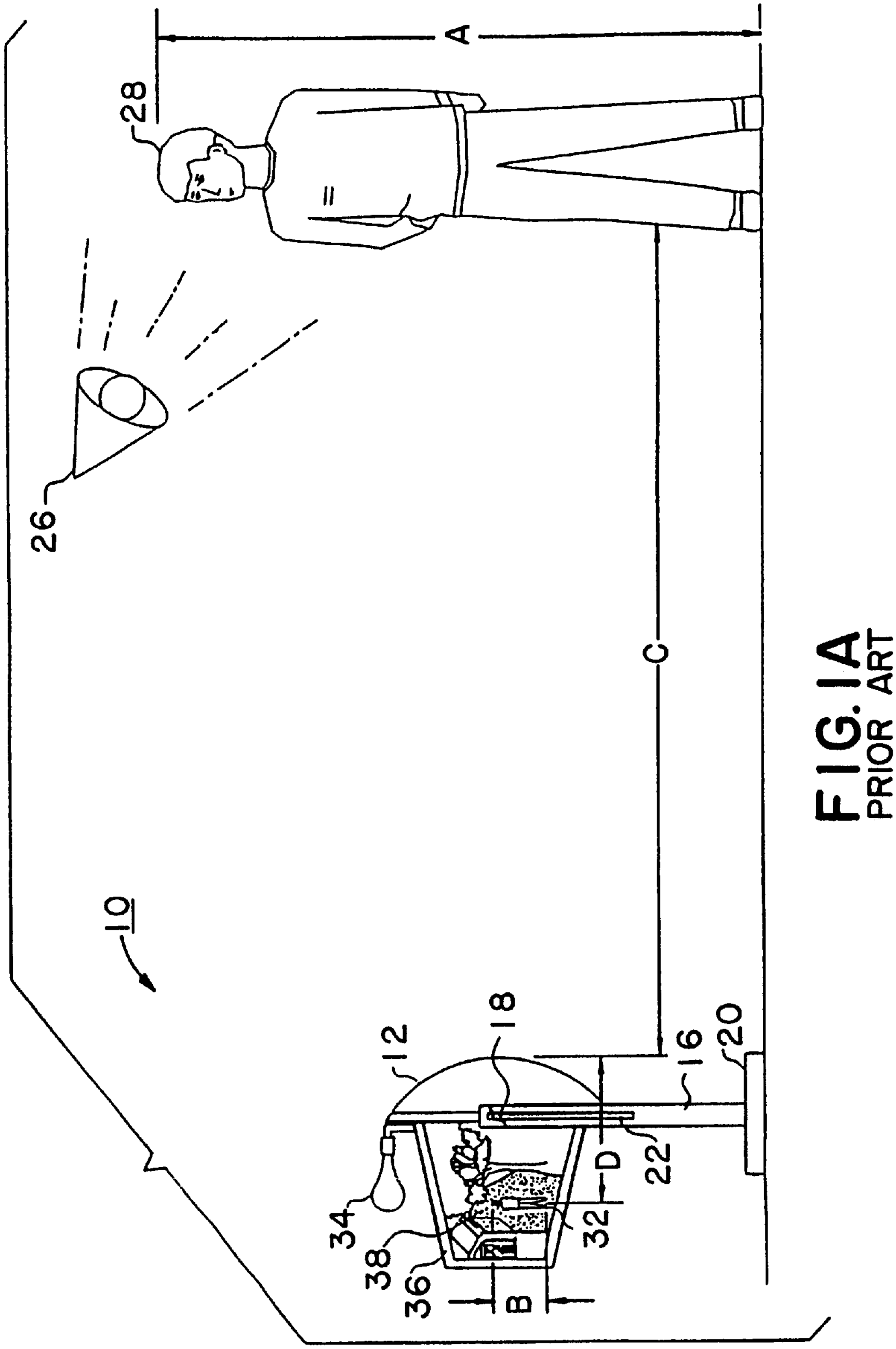
FIG. 1A PRIOR ART
FIGS. 1A, 1B, 1C & 1D are from prior art U.S. Pat. No. 4,971,312, herein incorporated by reference.
Figure 1B:
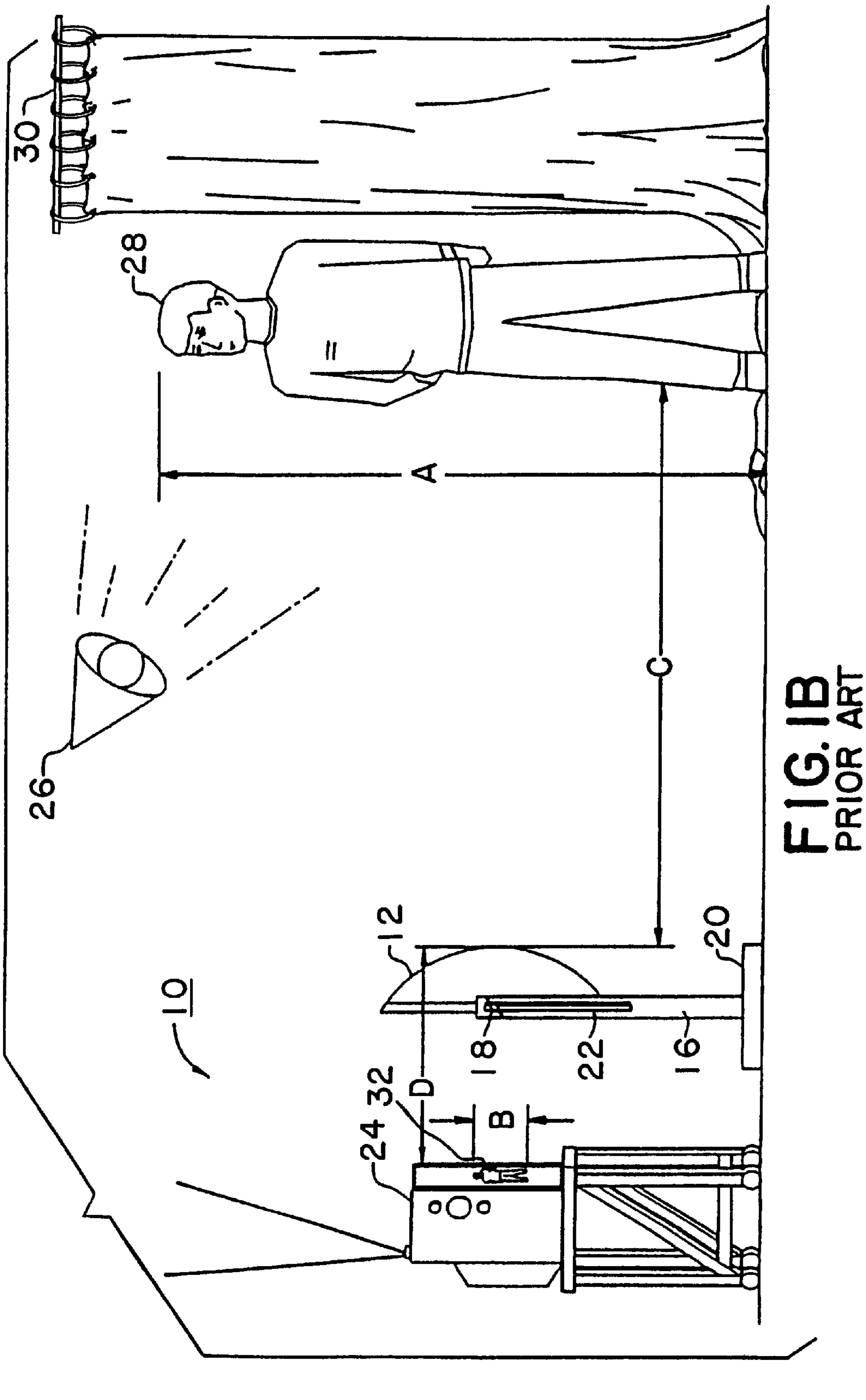
FIG. 1B PRIOR ART

The prior art from U.S. Pat. No. 4,971,312, herein incorporated by reference, is illustrated in FIGS. 1A, 1B, 1C and 1D. In FIG. 1A the display is a diorama, while in FIG. 1B the display is a video image of a TV monitor. Darkened area 38 receives the image 32 of viewer 28. In this case, the shape of the darkened area bears no direct relation to the shape of the viewer. The substance of the scene in the diorama does not begin at the periphery of the viewer image. In fact, the viewing environment may show as part of the composite image. This is an annoyance that can be ameliorated by vignetting the darkened area in the diorama, by leaving the viewing environment unlit, or by providing a dark drape behind the viewer as shown in FIG. 1B.

Figure 1C:
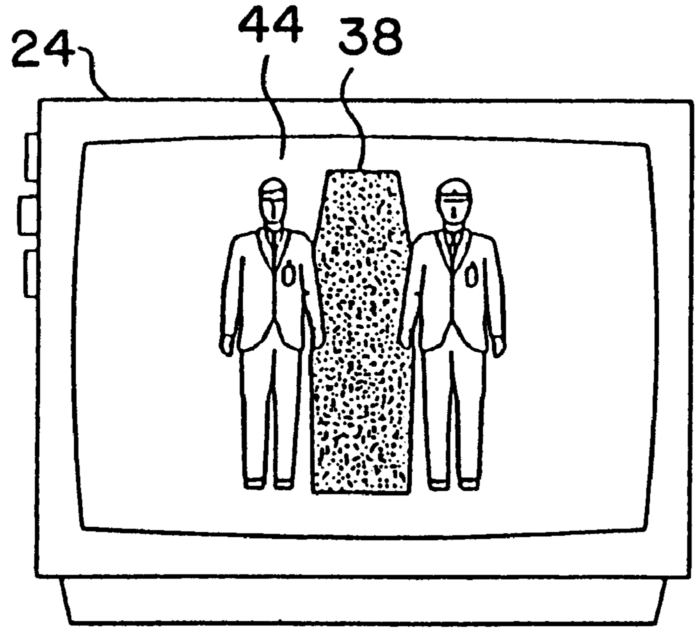
FIG.1C PRIOR ART
Figure 1D:
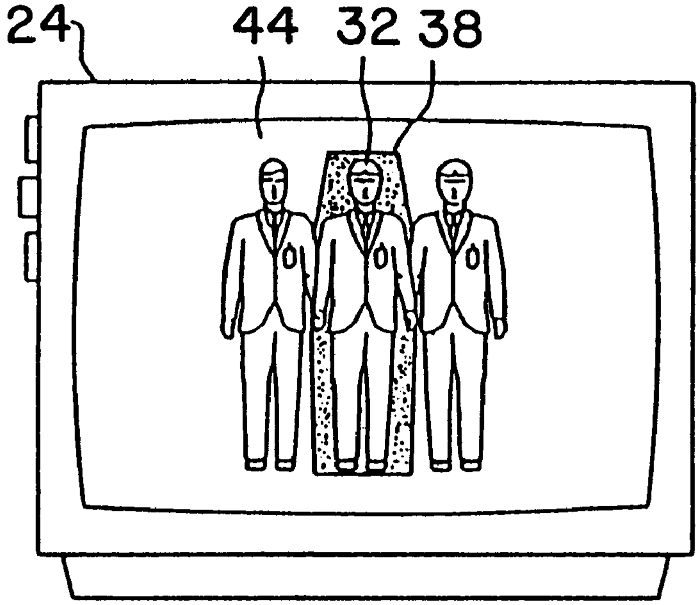
FIG.1D PRIOR ART

In FIG. 1C, a darkened area 38 is provided in a video display. As shown in FIG. 1D, the viewer's image fits within, but does not fill the darkened area. Here also, there is an ambiguous area which is neither scene nor viewer, but which can be minimized as mentioned above.

It is desirable to create a more tightly fitted insert or matte. A typical chroma-key video, for example, produces an almost seamless image. Cinema technology, such as travelling mattes and digital laser scanning, also provides invisible matte lines.

Some uses of the Illusion Apparatus of U.S. Pat. No. 4,971,312, previously incorporated herein by reference, allow a display format which can produce excellent quality inserts.

One way to provide well fitted inserts would be for the display's dark area to be shaped more or less like the viewer and for the viewer to move smartly to keep his/her image within the preferably moving, dark area.

At first glance, this does not seem likely to be practical.

It is, however, practical and useful to apply an exactly opposite strategy. It is possible to provide a perfectly fitted matte by making the dark area larger. That is,. rather than inserting the viewer into the display, a visual element of the display is instead inserted into the image of the viewing environment. This has several uses. For example, in the case where the display is an action (moving) display. The visual element to be inserted is preferably the image of an individual, particularly that of a trainer or teacher. The trainer thus can appear to be standing beside his/her trainee, the viewer, in the viewer's living room.

Figure 2:
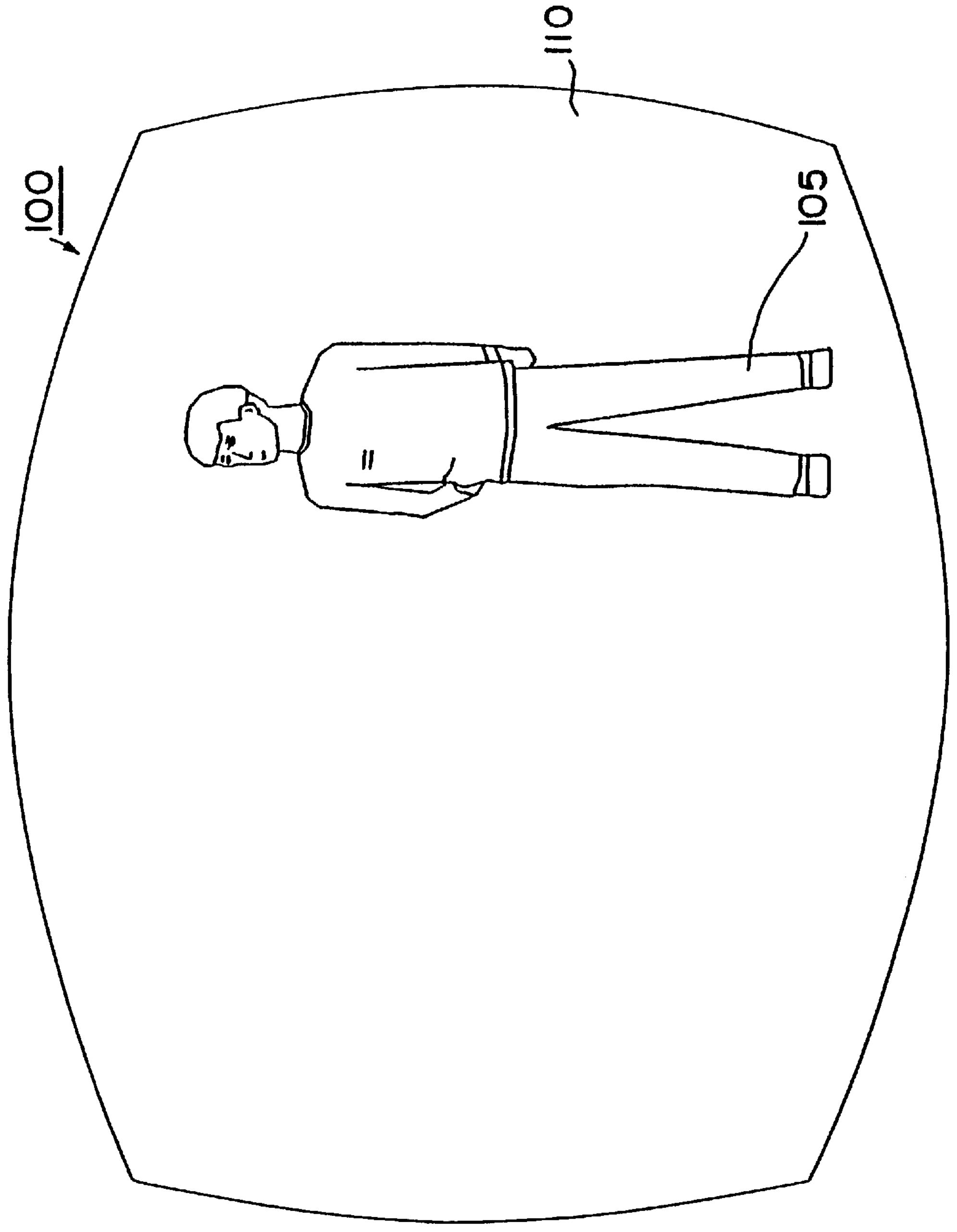
FIG. 2 illustrates a video screen, showing a display according to the preferred embodiment of the invention.

FIG. 2 shows one form of the preferred training video display 100. A bright image 105 of the trainer appears on a solid black background 110. In order for certain activities to seem natural to the majority of viewers and particularly where an activity has only one asymmetrical form, the preferred embodiment requires that the trainer's image be left-right reversed. This is in order that the viewer's mirror image can follow the trainer's lead. Ballroom dancing and the manual of arms are particular examples.

The reversal may be accomplished electronically or the video shot through a mirror.

Although a video, made using a video camera, is the preferred form of display, other video storage means, such as a laser disc, or still ("non-action" type) displays, such as, print, diorama or other display means are possible. A computer generated display, with an assumed camera position is also possible. A matte black box could hold a marionette for insertion into the image of a child's playroom. The marionette could appear as large as the child's image. The background need not, of course, be absolutely and completely black, but could contain, for example, the image of a strip of grass, to support a golf lesson.

The dark background might also contain additional visual elements to be inserted. As non-limiting but illustrative examples, reference may be made to other bright objects, such as bits of fairy dust to accompany a visit from Peter Pan or a shower of stars from a fairy godmother's wand. It is, however, preferable that at least a majority (at least 50%) of the display's area and/or perimeter be dark.

The viewer thus has a wide latitude in position, while the composite image appears to be seamless.

To add to the illusion, it is usually preferable that the trainer or other inserted visual element address the dark space beside him/her/it rather than follow the usual practice of addressing the camera. Thus, the bright image 105 of the trainer has the trainer's head turned to address the viewer's image rather than the viewer.

The illusion effect may also be enhanced by setting the camera elevation in making the display image to the elevation expected for the viewer imaging device to be used at the time of viewing.

Figure 3:
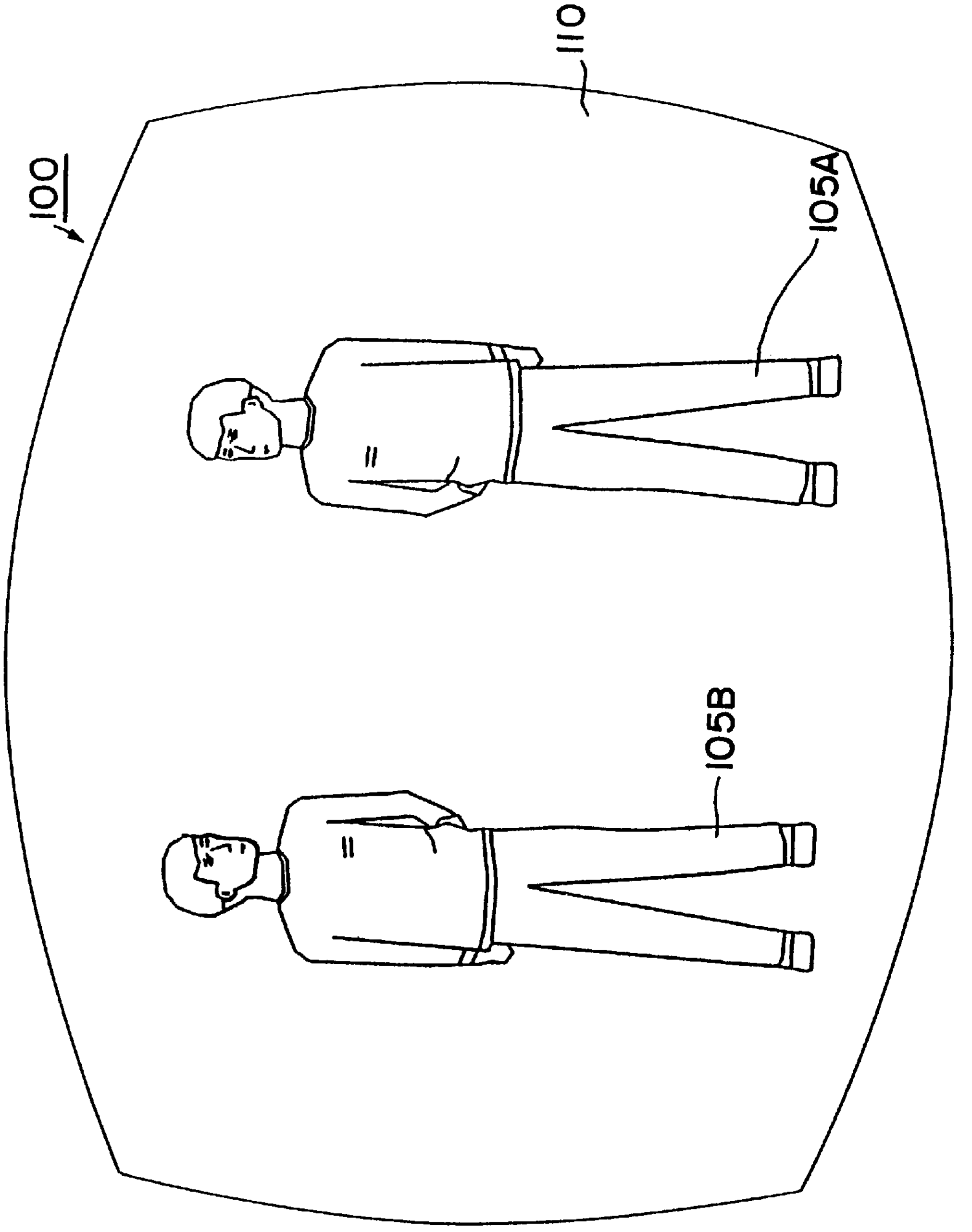
FIG. 3 illustrates a video screen showing a display for right or left handed training according to an alternate embodiment of the invention.

FIG. 3 shows a training video display 100, which is preferred for training in activities such as golf or tennis in which handedness varies and is important. Here, dark background 110 holds two bright images 105A and 105B. Image 105A is a reversed, left handed trainer, 105B is the unreversed image of the same trainer.

For use with the Illusion Apparatus of U.S. Pat. No. 4,971,312, the viewer may cover one image with a black drape or other cover and use the other image as the trainer, or a video switch may be made by ordinary means to delete the undesired portion (e.g. one-half) of the visual field.

Figure 4:
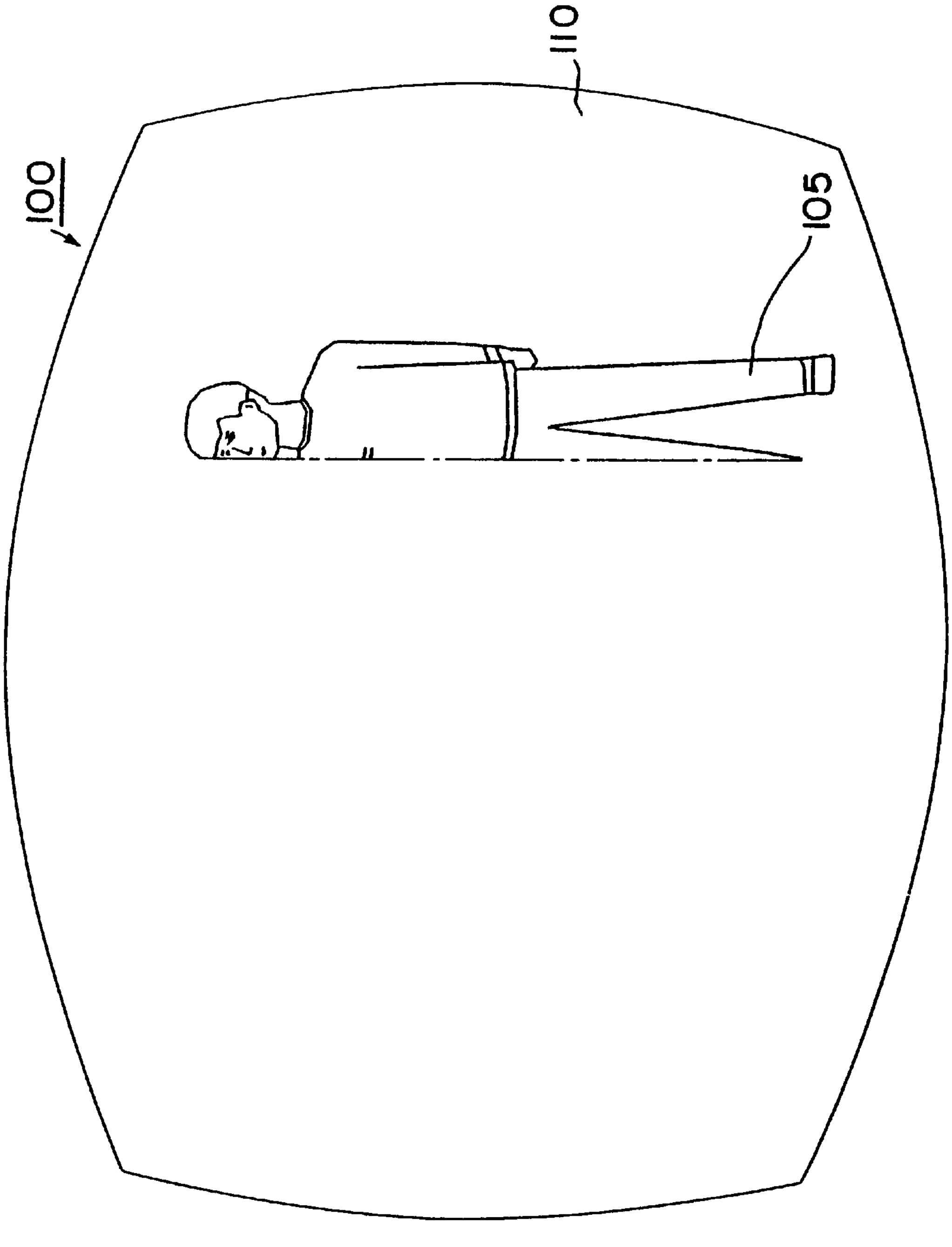
FIG. 4 illustrates a video screen showing a modified display according to the preferred embodiment of the invention.

FIG. 4 illustrates a modified form of the preferred embodiment which enhances the apparent interaction between the bright image 105 of the display 100 and the viewer's image to be inserted.

Here the bright image 105 is interrupted in the area of the background 110 where the viewer's image is likely to be found. This can be accomplished electronically or by a black drape or mask during production of the display 100. Although the interrupted edge will not likely be at all a precise matte line, the accuracy of the remaining edge and a preferably brief time of interaction can form a convincing element of the illusion. For best results the interrupted edge should be vignetted.

The apparatus of this invention and method of creating an illusion includes image projection means for juxtaposing the bright image of the display and the image of the external object (e.g. viewer) and environment of the object. The image projection means, in one embodiment, is that described in my prior issued U.S. Pat. No. 4,971,312, incorporated herein by reference. Briefly, the image projection means includes a partially reflective, partially transparent convex mirror located between the object and the display. The mirror is convex in the direction of the object so as to diminish the size of the projected image of the object, whereby the bright image appears to be within the environment of the object. For further details, reference is made to U.S. Pat. No. 4,971,312.

The training video and other applications wherein visual elements are to be inserted into the image of the viewer's environment do not, however, require the use of the image projection means of the Illusion Apparatus disclosed in U.S. Pat. No. 4,971,312, but permit application with an electronic display and video imaging system.

Figure 6:
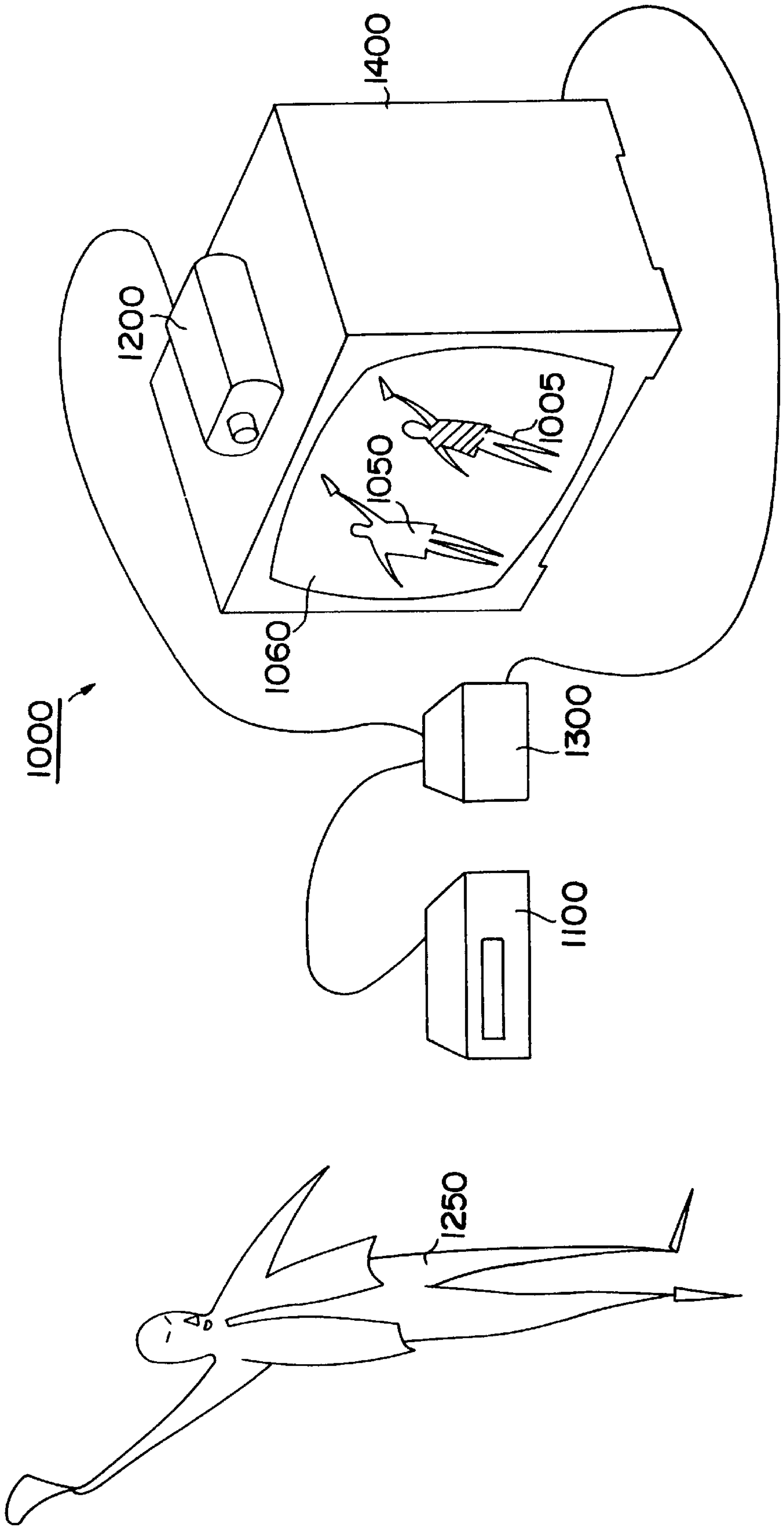
FIG. 6 illustrates an electronic system utilizing the invention.

FIG. 6 shows an electronic system 1000 which can use the training videos disclosed herein. This system is compatible with video produced for use with the Illusion Apparatus of the prior art and is preferred for large video displays.

An ordinary VCR 1100 (VHS, Super VHS, 8 mm, etc.) is used to play a prerecorded videotape bearing the bright image 1005 of the trainer, storyteller, fairy godmother or other visual element against a black background. Instead of an ordinary VCR a laser disc player or CD Rom player, etc. may be used to provide the display according to this invention. The image of the display is delivered to luminance key 1300 by ordinary means.

Video camera 1200 captures the image 1050 of viewer 1250 within the image of the viewing environment 1060. The image of viewer and environment is also delivered by ordinary means to luminance key 1300.

Luminance key 1300 includes means, well known in the art, to cause left-right reversal of the image from camera 1200, inserts the reversed image into the dark area of the image from VCR 1100, and transmits the composite image to video monitor 1400, all by ordinary means. Alternatively, the left-right reversal means may be provided as a separate unit connectable to the luminance key and to the video camera or VCR in any desired order. As still a further alternative, the left-right reversal means may be included in the video monitor, and such types of monitors are also commercially available.

Because of the left-right reversal, the video system 1000 acts like a mirror, rather then like ordinary video. This can also be accomplished by optical means, as by a prism or mirror in front of the camera lens, but in any case provides a reversed image. The reversed image is far easier than a true image for the viewer to understand and imitate while attempting to follow the trainer.

This is true for insertions of the viewer, with or without the viewer's environment, into a composite image to be watched by the viewer. Other methods of insertion to which this could be applied include chroma-key and the difference key of Barnett et al U.S. Pat. No. 4,800,432, incorporated herein by reference thereto.

Figure 7:
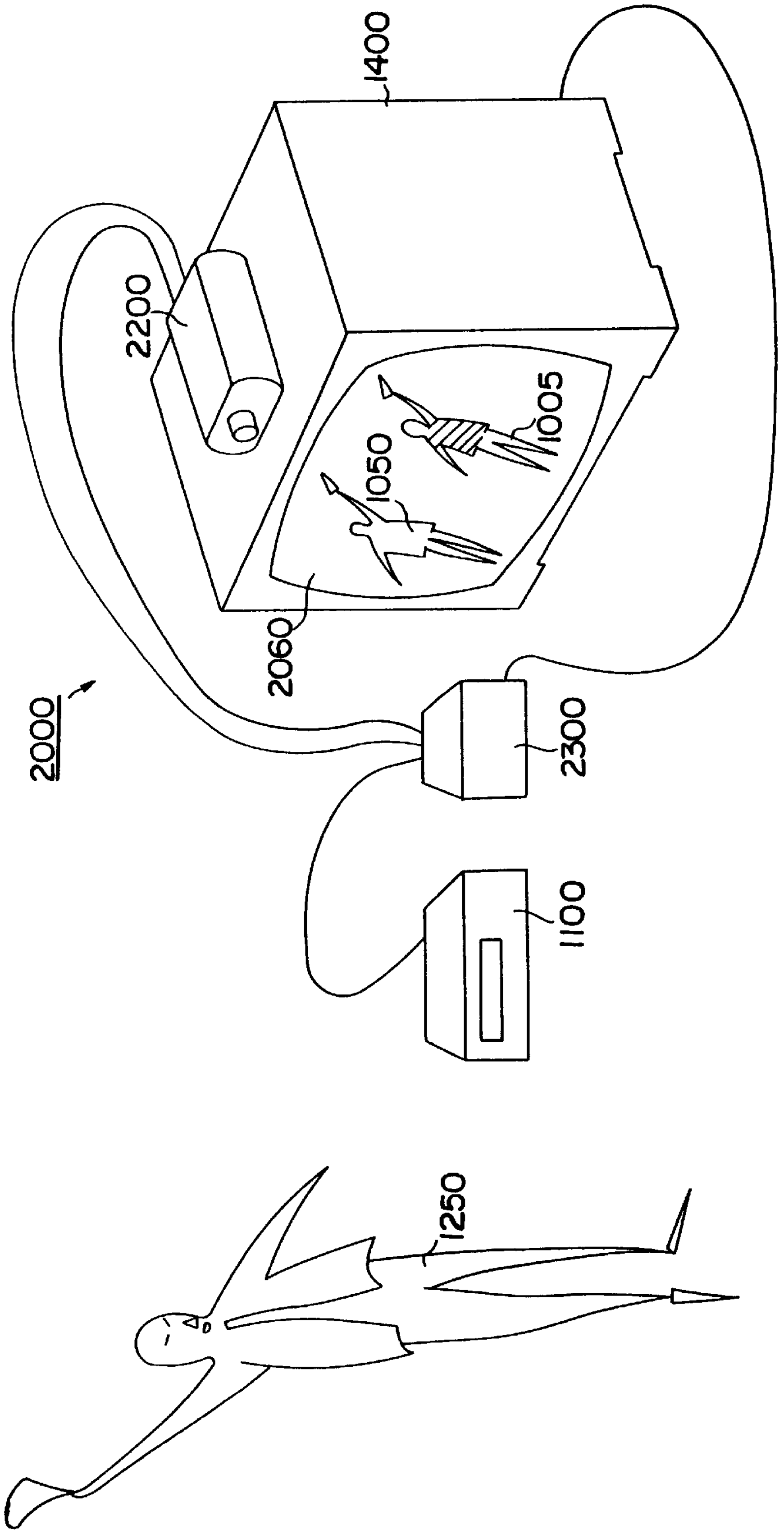
FIG. 7 illustrates an alternative electronic system utilizing the reversed image of the invention.

FIG. 7 shows a proposed method of image insertion which could also benefit, for the viewer's convenience, in following an activity, from reversal of the inserted image.

Camera 2200 captures the viewer's image in both visible light and infra-red. Both images are transmitted to infra-red key 2300. Also transmitted to infra-red key 2300 is a video image from VCR 1100.

In this case, video monitor 1400 produces a composite image of the reversed image 1050 of the viewer 1250 inserted into a prepared image including not only a bright image or images 1005, but also a bright prepared background 2060. This is accomplished by keying the image from VCR 1100 into the cold or non-viewer areas of the infra-red signal from camera 2200 and by keying the visible light signal from camera 2200 into the warm areas of the infra-red signal.

The system of FIG. 7 also allows electronic tracking of the viewer and is, in that respect, similar to chroma-key and difference key.

Use of a training video, particularly as described in the preferred embodiment of FIG. 2, can make possible well fitted inserts as discussed earlier. Once the viewer has learned a specific series of movements, the black background can give way to a less dark or bright scene. The bright scene is interrupted only in a small dark area which follows the prescribed motions previously learned by the viewer.

Figure 5:
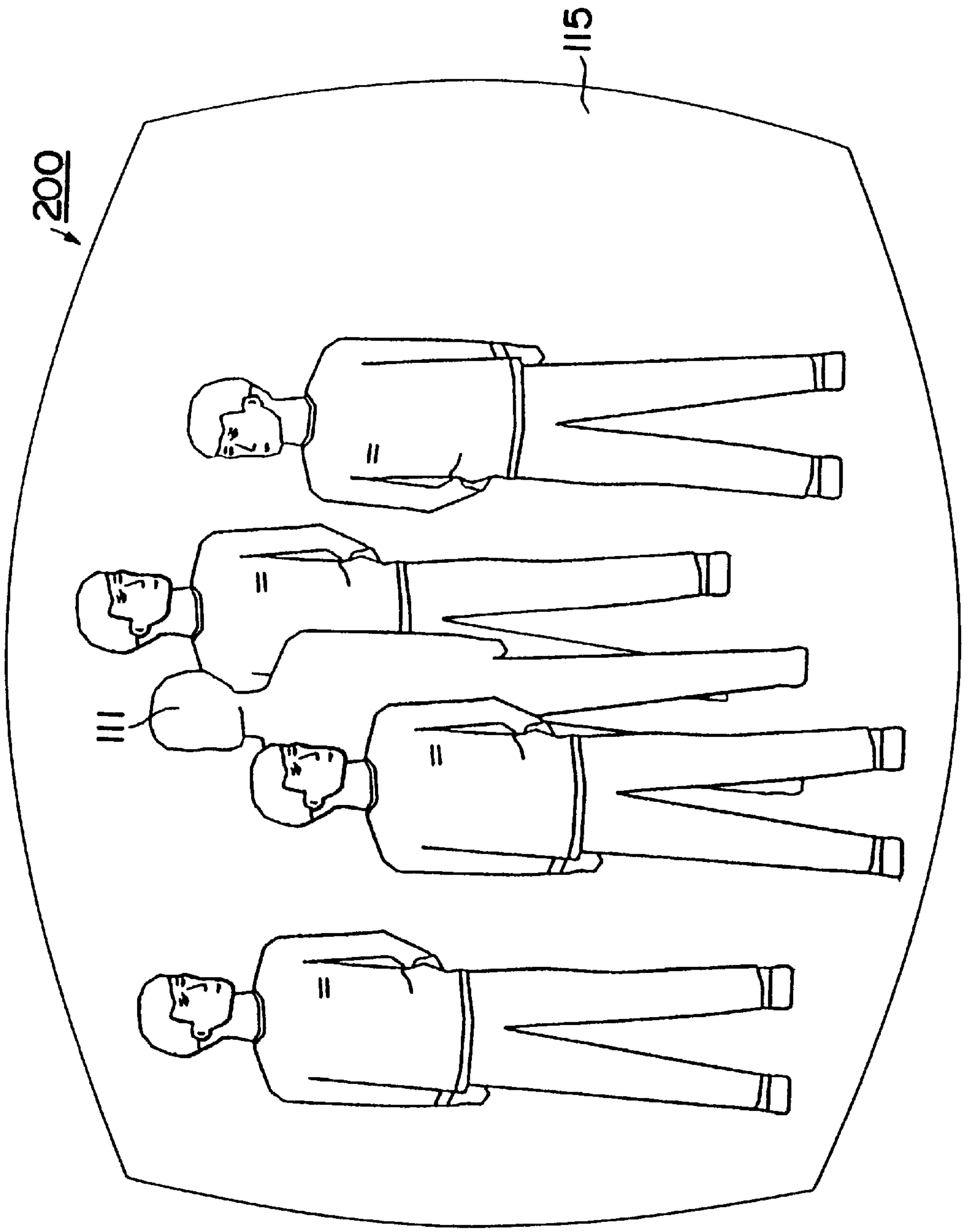
FIG. 5 illustrates a video screen showing a follow-up display incorporating an animated dark area.

FIG. 5 shows a display 200 utilizing a small dark area 111 within an otherwise bright scene 115. An especially strong illusion of interaction is presented by including image elements "before" and "behind" the dark area.

The preferred method of creating a dark area for this display format is to dress an actor totally in black and for the actor to follow the prescribed motions to be learned by the viewer from the preferred embodiment of the invention.

While the invention has been described with reference to preferred embodiments thereof, it will be appreciated by those of ordinary skill in the art that modifications can be made to the invention without departing from the spirit and scope thereof.

I claim:

1. A method for displaying a composite image comprising:

capturing an infra-red image of a viewer of the composite image, the viewer being in an ordinary environment;

capturing a visible light image of the viewer essentially congruent to the infra-red image;

providing an independent image;

replacing a portion of the visible light image with a portion of the independent image according to the intensity of the infra-red image; and transmitting the resulting image to a display means, whereby the composite image comprising the independent image and the visible light image of the viewer is displayed.

2. The method of claim 1 wherein the visible light image of the viewer is displayed left-right reversed.

3. The method of claim 1 where the display means is a video display means.

4. The method of claim 1 wherein the image of the viewer is displayed in real time.

5. The method of claim 1 wherein a portion of the visible light image corresponding to a relatively cold area of the infra-red image is replaced by a portion of the independent image.

6. Apparatus for displaying a composite image of an independent image and a viewer of the composite image comprising:

infra-red imaging means, to capture an image of the viewer, the viewer being in an ordinary environment;

visible light imaging means, to capture an image of the viewer essentially congruent to the infra-red image;

an independent image source, to provide the independent image;

replacement means, to replace a portion of the visible light image of the viewer with a portion of the independent image according to the intensity of the infra-red image; and display means, whereby the composite image is displayed.

7. The apparatus of claim 6 wherein the display means is a video display means.

8. The apparatus of claim 6 wherein a portion of the visible light image corresponding to a relatively cold area of the infra-red image is replaced by a portion of the independent video image.

9. The apparatus of claim 6 wherein the independent image source is a video image storage means.

10. The apparatus of claim 6 wherein the visible light image of the viewer is displayed left-right reversed.

11. The apparatus of claim 6 wherein the visible light image of the viewer is displayed in real time.

12. The apparatus of claim 6 wherein the replacement means is a video switching means.

* * * * *